United States Patent Office 2,742,931
Patented Apr. 24, 1956

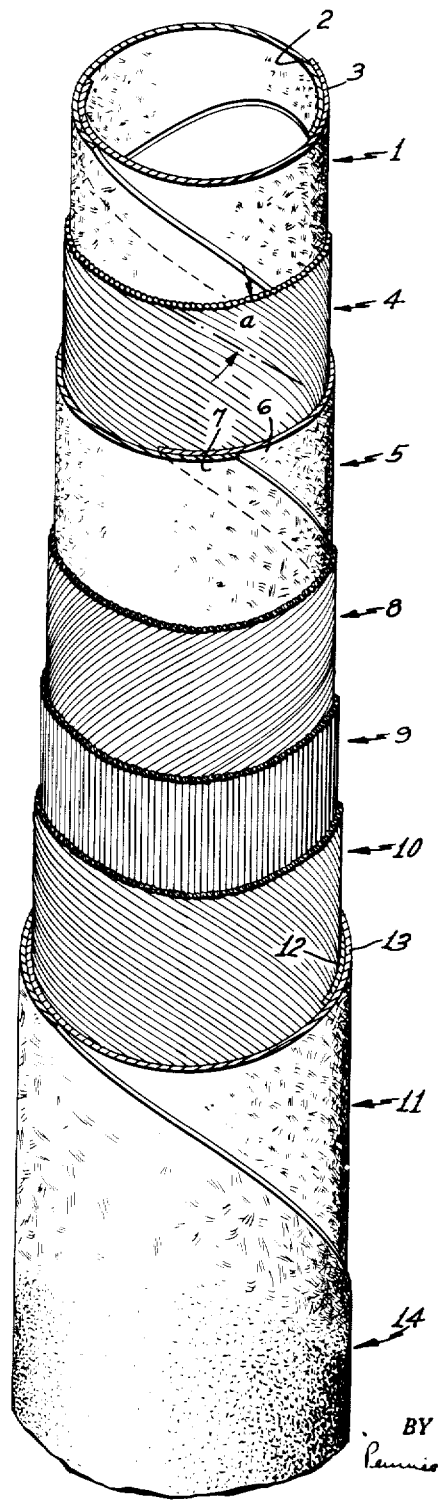

2,742,931

REINFORCED PLASTIC PIPE

Carl de Ganahl, Greenlawn, N. Y.

Application August 4, 1951, Serial No. 240,359

10 Claims. (Cl. 138—76)

This invention relates to the manufacture of pipe, and is concerned particularly with the provision of an improved pipe of the type having a cylindrical wall composed essentially of fiber-reinforced plastic material.

In the copending application of myself and John A. Grant and Clare E. Bacon, Serial No. 180,066, filed August 17, 1950, now Patent No. 2,714,414, August 2, 1955, a method is described for making pipe by wrapping glass fiber rovings, which have been impregnated with an unpolymerized plastic composition, helically about a mandrel. The resulting wrapping is treated on the mandrel to set the plastic, and subsequently is withdrawn from the mandrel in the form of a pipe composed essentially of plastic material reinforced by the helical glass fiber rovings embedded therein.

An extensive series of pressure tests on pipe of this character has shown that it is not fluid tight at pressures one would expect it to withstand in view of the high tensile strength of the glass reinforcing fibers. The pipe does not burst, but at a pressure well below that corresponding to the maximum strength of the pipe as computed from the tensile strength of the glass reinforcing fibers, the fluid under pressure begins to exude through the wall of the pipe. In appearance, the wall of the pipe seems to become somewhat porous to the pressure fluid, even though prior to the test no porosity was apparent.

A careful examination of pipe that has failed in this manner (and the passage of fluid through its walls is indeed the result of a failure of the pipe structure) reveals that such failure is due to cracks that have formed in the plastic parallel with and between the rovings caused by shear in a radial direction of the plastic material in which the glass reinforcing fibers are embedded. It is of course impossible, as a practical matter, to apply each reinforcing fiber with exactly the same tension as each other, and in consequence a rather moderate internal hydraulic pressure is sufficient to produce minute shear cracks in the plastic, paralleling the helically applied reinforcing fibers. Once these shear cracks have formed, they provide channels through which fluid within the pipe may ooze when it is subjected to a sufficient pressure, though such pressure is well below the bursting strength of the pipe.

I have discovered that pipe failures of the type just described can be avoided by incorporating in the pipe structure a thin cylindrical layer of a substantially felted mat of glass fibers. In such a mat, the glass fibers are arranged with wholly random orientations. Such a layer is most conveniently applied in the form of a helical wrapping of a thin tape of the substantially felted mat. I have found that the mat is most effective for minimizing shear failures of the plastic when it is applied as the innermost of the several layers of glass fibers that are embedded in the plastic wall of the pipe. However, substantial improvement in the strength and other physical characteristics of the pipe can be achieved by applying such a felted mat layer elsewhere in the pipe wall structure. Preferably, in accordance with the invention, I apply one layer of the felted mat of glass fibers adjacent the inner surface of the pipe wall, another layer adjacent the outer surface of the pipe wall (these two layers forming respectively the innermost and outermost layers of glass reinforcing fibers); and advantageously still another layer of the felted mat is applied between successive layers of helically wrapped glass fiber rovings in the central portion of the pipe wall structure.

In my copending application Serial No. 235,646, filed July 7, 1951, I have described and claimed a pipe having a wall consisting essentially of glass reinforcing fibers bonded together by and substantially embedded in a monolithic and substantially impervious hollow cylindrical body of plastic material, characterized in that some of the glass reinforcing fibers are arranged longitudinally, parallel to the axis of the pipe, to enhance its beam stiffness. Also in said application I have described and claimed a pipe incorporating both helically disposed and longitudinally disposed reinforcing fibers, in which the helically disposed glass reinforcing fibers are arranged at an angle $a$ to a plane normal to the axis of the pipe such that $$3 \sin^2 a + \left(\frac{2}{m}\right) \sin a = 1$$

in which $m$ is the ratio of the total cross-sectional area (or aggregate tensile strength) of all the helically disposed glass fibers to the total cross-sectional area (or aggregate tensile strength) of all the longitudinally disposed glass fibers. As stated in said application, the advantage of applying the helical reinforcing fibers at this angle $a$ is to enable the pipe to resist equally well both the longitudinally acting and the circumferentially acting components of stress imposed on the pipe wall by internally applied pressure. It is of course within my contemplation that the features of the present invention, particularly involving the incorporation in the pipe structure of one or more layers of a felted mat of randomly oriented glass fibers, may be embodied in any of the pipe structure of said application Ser. No. 235,646.

It is implicit from the foregoing equation, and it is pointed out in my copending application, that when $m$ becomes infinite, i. e. when there are no longitudinally disposed glass fiber reinforcements in the pipe structure, the angle $a$ attains a limiting value of about 35°. In a pipe wherein helically applied glass fibers alone are used to reinforce against both longitudinal and hoop stresses, the helical reinforcements should be applied at this angle (about 35°) in order that the pipe will be equally strong in its ability to resist both the circumferential and the longitudinal components of stress imposed by an internally applied fluid pressure; and of course it is within my contemplation that in such a pipe, a felted glass mat of glass fibers may be used in accordance with the present invention.

A preferred embodiment of the present invention is described below with reference to the accompanying drawing, which shows in cut-away perspective an advantageous embodiment of a pipe made in accordance with the invention.

Since the pipe of the present invention constitutes an improvement on that made in accordance with the invention described in the aforesaid copending application Serial No. 180,066, it will be helpful to describe very briefly the manner in which such pipe is made. The procedure involves continuously passing a cylindrical mandrel vertically up through an apparatus by which glass fiber rovings are wrapped helically thereon. The apparatus described in said application comprises several horizontal tables arranged to be rotated about the mandrel, each table carrying a number of packages of glass fiber rovings, and the rate of rotation of the tables is correlated with the rate of advance of the mandrel so that the rovings are applied to the mandrel at the desired angle of lay. Some tables rotate in one direction and others in the opposite direction, so that the pitches of the helices of the rovings in different layers are opposite in direction. As described in said application, the rovings are thoroughly impregnated with and coated by an unpolymerized or otherwise unset plastic composition as they are applied to the mandrel. After covering a suitable length of the mandrel with the glass fiber and plastic composition, such mandrel length and the coating thereon is removed from the coating-applying apparatus and is treated to set the plastic; and thereafter, the set composition is removed from the mandrel in the form of a length of pipe whose wall consists essentially of a monolithic hollow cylindrical body of plastic material in which the multiplicity of helically disposed glass fiber reinforcements are embedded.

Pipe according to the present invention may be made substantially by the method and with apparatus substantially of the character described in the aforesaid application Serial No. 180,066. In accordance with the invention, however, some of the glass fibers are incorporated in the pipe structure in the form of one or more layers of a substantially felted mat in which the fibers are arranged with wholly random orientations. This mat is advantageously applied in the form of a thin tape of felted glass fibers which is wrapped helically about the mandrel at one or more appropriate positions in the pipe structure.

Referring to the accompanying drawing, the pipe there shown comprises an inner layer 1 of substantially felted randomly oriented glass fibers. This layer is applied in the form of two tapes 2 and 3 of felted glass fiber mat which have been wrapped helically in place, preferably with a substantial overlap. Surrounding this layer of felted mat is a layer of glass fiber rovings 4 wrapped helically in place and distributed uniformly about the periphery of the pipe. Next another layer of randomly oriented glass fibers 5, in the form of two separate overlapping felted mat tapes 6 and 7, is helically wrapped in place. Then follows another layer of helically applied glass rovings 8, similar in all respects to the preceding layer of rovings 4, except that the pitches of the helices of the rovings in the two layers, though substantially equal in magnitude, are opposite in direction. A layer of longitudinally-extending glass fiber rovings 9, arranged parallel to the axis of the pipe, is applied over the helically wrapped rovings 8. Then follows a layer of helically applied glass fiber rovings 10 similar in most respects to the layers of rovings 4 and 8. The direction of lay of the rovings 10 is opposite to that of the next underlying layer of helically applied rovings 8. This outer layer of helically applied rovings 10 serves primarily to hold the layer of longitudinal rovings 9 in place during manufacture of the pipe, and it may therefore comprise fewer and more widely spaced rovings than are employed in making up either of the underlying layers of helically applied rovings 4 and 8. An outer layer 11 of felted glass fibers, made up of a pair of helically wrapped tapes 12 and 13 of glass fiber mat or felt, completes the glass fiber reinforcement of the pipe structure. All of the layers of glass fibers, from the innermost layer 1 to the outermost layer 11, are bonded together by and substantially embedded in a monolithic and substantially impervious hollow cylindrical body of plastic indicated generally at 14.

As pointed out in my aforementioned application Serial No. 235,646, it is advantageous that all the helically applied reinforcing fibers (i. e. the rovings in layers 4, 8 and 10) be arranged at an angle $a$ to a plane normal to the axis of the pipe such that $$3 \sin^2 a + \left(\frac{2}{m}\right) \sin a = 1$$

where $m$ is the ratio of total tensile strength of all the helically disposed glass reinforcing fibers (in the layers 4, 8 and 10) to the total tensile strength of all the longitudinally disposed glass reinforcing fibers (in the layer 9). The pipe then is equally strong in its ability to resist both the longitudinal component and the circumferential (hoop) component of the stress exerted by internally applied fluid pressure. The required angle of lay $a$ for any given value of the ratio $m$ is determined by substituting this value for $m$ in the equation and solving the equation for the angle $a$, disregarding, of course, any negative values for $a$ that may be obtained. If the longitudinally disposed fibers are omitted, the ratio $m$ is infinity and the angle $a$ should be about 35°. The magnitude of angle $a$ corresponding to certain other values for the ratio $m$ is set forth in the following table:

| $m$ | sin $a$ | $a$, degrees |
|---|---|---|
| 0.5 | .2153 | 12.44 |
| 1 | .3333 | 19.47 |
| 2 | .4343 | 25.73 |
| 3 | .4769 | 28.48 |
| 4 | .5000 | 30.00 |
| 5 | .5154 | 31.00 |
| 10 | .5450 | 33.03 |
| 20 | .5525 | 33.54 |
| 100 | .5770 | 35.24 |

The tapes 2 and 3, 6 and 7, and 12 and 13, which make up the several layers of substantially felted randomly oriented glass fibers, are composed essentially of glass fibers assembled rather compactly together with wholly random orientations, and sufficient polystyrene resin or other binder material to hold them in a coherent substantially felted mat. The thickness of the mat need not be and preferably is not very great—a mat of thickness in the range from 0.010" to 0.020" is available commercially and is ample. The width of the tapes depends, of course, on the size of the pipe, the number of tapes used in each layer, and the angle at which the tape is helically wrapped in place. In general, I have found it most convenient to employ two tapes in making up each layer of the randomly oriented glass fibers, so that the packages from which these tapes are wrapped about the mandrel on which the pipe is formed may be arranged to impose a symmetrical load on the pipe-making apparatus. So far as concerns the pipe structure, however, the number of such tapes used is not of importance.

The joints between successive wrappings of tape should be overlapped, primarily to be sure that no gaps occur in the layer of randomly oriented fibers. If the tapes are just wide enough so that when spirally wrapped on the mandrel they are contiguous or even allow a gap between the tapes but are not overlapping, an area of unreinforced plastic occurs where fracture cracks will take place between the tapes, causing leakage failure. Accordingly, application of the tapes with an overlap is required.

The plastic material 14 which forms the substantially impervious cylindrical body in which the glass fiber rovings are embedded in the pipes of Figs. 1 and 2 may be any natural or synthetic material of the type commonly known by the term "plastic," whether it be thermoplastic or thermosetting in character. The plastic matetrial serves to bond the glass fiber rovings together, to render the pipe wall impervious to the passage of fluids, and to contribute compressive strength sufficient to support the fibrous elements of the pipe. While any plastic material can be used to perform these functions more or less well, I find it generally advantageous to employ a composition of styrene and an alkyd resin as the plastic material, because the physical properties of this resin composition are particularly desirable for the most common uses to which pipes are put. It possesses substantial mechanical strength, it is resistant to attack by the fluids most commonly conveyed by pipes, the ingredients are available in quantity at moderate cost, and it lends itself readily to the fabrication of pipe of the character described. Other synthetic resinous materials that may be employed in making pipe according to the invention are the vinyl halide resins and copolymers with vinyl esters, nylon, methacrylate resins, polyethylene, phenol-, urea- and melamine-formaldehyde condensation polymers, cellulose esters, and various blends of these and other materials. However, it is not essential that the plastic material employed be a synthetic resin. It may instead be a natural product such as a natural wax, resin or gum for those rather rare and infrequent uses where such materials have advantageous physical properties for the particular use to which the pipe is to be put.

The plastic which forms the impervious cylindrical pipe body must of course be compatible with whatever binder is used in making the felted mat from which the tapes 2, 3, 6, 7, 12 and 13 are made, but this condition is a very easy one to meet. A polystyrene binder which is soluble in the unpolymerized styrene and alkyd resin composition I prefer to employ is used commercially in making glass fiber mats from which such tapes may be cut.

The provision of the layers 1, 5 and 11 of substantially felted randomly oriented glass fibers have been found in actual experience very substantially to enhance the ability of the pipe structure to withstand internally applied hydrostatic pressure without leakage. The provision of the innermost such layer 1 is particularly important in this respect; and if the pipe structure is to be made up with but a single layer of the randomly oriented fibers, it will be most effective if it is applied as the innermost layer, directly underlying the first of the helically applied rovings. In a pipe structure having only one such layer of felted fibers, applied as the innermost layer, the pressure to which water within the pipe could be subjected, without any leakage whatever through the walls of the pipe, was substantially doubled as compared with a similar pipe having no felted mat layer in its structure. By providing two or more such felted mat layers, properly located with respect to the helically and longitudinally applied rovings, it is possible for the pipe to be made to withstand internally applied hydrostatic pressure, without leakage, up to a value representing substantially the full tensile strength of the helically and longitudinally applied glass fiber reinforcements.

I claim:

1. A pipe consisting essentially of glass reinforcing fibers bonded together by and substantially embedded in a monolithic and substantially impervious hollow cylindrical body of plastic material, a portion of said fibers being rovings disposed helically in at least two cylindrical layers in which the pitches of the helices are opposite in direction but substantially equal in magnitude, each of said rovings being completely surrounded by and impregnated with the plastic material, and the helically disposed rovings in each layer thereof being arranged in closely spaced substantially side-by-side relation, and a further portion of said fibers being disposed in at least one other cylindrical layer in which they are arranged with wholly random orientations in a substantially felted mat.

2. A pipe consisting essentially of glass reinforcing fibers bonded together by and substantially embedded in a monolithic and substantially impervious hollow cylindrical body of plastic material, a portion of said fibers being rovings disposed helically in at least two cylindrical layers in which the pitches of the helices are opposite in direction but substantially equal in magnitude, each of said rovings being completely surrounded by and impregnated with the plastic material, and the helically disposed rovings in each layer thereof being arranged in closely spaced substantially side-by-side relation, and a further portion of said fibers being disposed in a third cylindrical layer in which they are arranged with wholly random orientations in a substantially felted mat, said mat layer being disposed inwardly of and contiguous to one of said helical layers.

3. A pipe consisting essentially of glass reinforcing fibers bonded together by and substantially embedded in a monolithic and substantially impervious hollow cylindrical body of plastic material, a portion of said fibers being rovings disposed helically in at least two layers in which the pitches of the helices are opposite in direction but substantially equal in magnitude, the helically disposed rovings in each layer thereof being arranged in closely spaced substantially side-by-side relation, a further portion of said fibers being rovings disposed in a third layer in which they are arranged longitudinally of the pipe substantially parallel to its axis, each of said rovings being completely surrounded by and impregnated with the plastic material, and still another portion of said fibers being disposed in a fourth layer in which they are arranged with wholly random orientations in a substantially felted mat.

4. A pipe according to claim 3, in which the felted mat layer is the innermost of the several layers of glass fibers, and in which it is directly surrounded by and contiguous to one of the layers of helically disposed fibers.

5. A pipe consisting essentially of glass reinforcing fibers bonded together by and substantially embedded in a monolithic and substantially impervious hollow cylindrical body of plastic material, a portion of said fibers being rovings disposed helically in at least two layers in which the pitches of the helices are opposite in direction but substantially equal in magnitude, the helically disposed rovings in each layer thereof being arranged in closely spaced substantially side-by-side relation, a further portion of said fibers being rovings disposed in a third layer in which they are arranged longitudinally of the pipe substantially parallel to its axis, each of said rovings being completely surrounded by and impregnated with the plastic material, and still another portion of said fibers being disposed in at least two further layers in which they are arranged with wholly random orientations in a substantially felted mat, said two layers of randomly oriented fibers being respectively the innermost and outermost layers of fibers.

6. A pipe consisting essentially of glass reinforcing fibers bonded together by and substantially embedded in a monolithic and substantially impervious hollow cylindrical body of plastic material, said glass fibers being applied in a series of concentric layers comprising (1) a helical wrapping of a tape of randomly oriented substantially felted glass fibers, and (2) at least two layers of helically disposed glass fiber rovings directly overlying said tape wrapping, the pitches of the helices in said layers of rovings being opposite in direction but substantially equal in magnitude, each of said rovings being completely surrounded by and impregnated with the plastic material, and the helically disposed rovings in each layer thereof being arranged in closely spaced substantially side-by-side relation.

7. A pipe consisting essentially of glass reinforcing fibers bonded together by and substantially embedded in a monolithic and substantially impervious hollow cylindrical body of plastic material, said glass fibers being applied in a series of layers comprising (1) a helical wrapping of a tape of randomly oriented substantially felted glass fibers, (2) at least two layers of helically disposed glass fiber rovings overlying said tape wrapping, and (3) at least one layer of longitudinally disposed glass fiber rovings extending substantially parallel to the axis of the pipe, the pitches of the helices of the rovings in said layers of helically disposed rovings being opposite in direction but substantially equal in magnitude, and said helically disposed rovings being arranged at an angle $a$ to a plane normal to the axis of the pipe such that $$3 \sin^2 a + \left(\frac{2}{m}\right) \sin a = 1$$

in which $m$ is the ratio of the total cross-sectional area of all the glass fibers in helically disposed rovings to the total cross-sectional area of all the glass fibers in longitudinally disposed rovings.

8. A pipe consisting essentially of glass reinforcing fibers bonded together by and substantially embedded in a monolithic and substantially impervious hollow cylindrical body of plastic material, said glass fibers being applied in a series of layers comprising (1) a first helical wrapping of a tape of randomly oriented substantially felted glass fibers, (2) a first layer of helically disposed glass fiber rovings overlying said first tape wrapping, (3) a second helical wrapping of tape of randomly oriented substantially felted glass fibers overlying said first layer of helically disposed rovings, (4) a second layer of helically disposed glass fiber rovings overlying said second tape wrapping, the pitch of the helix of said second layer of helically disposed rovings being opposite in direction but substantially equal in magnitude to that of the first layer of helically disposed rovings, (5) a layer of longitudinally disposed glass fiber rovings extending substantially parallel to the axis of the pipe, and (6) a third helical wrapping of tape of randomly oriented substantially felted glass fibers, said third tape wrapping forming the outermost of the layers of glass fibers, each of said rovings being completely surrounded by and impregnated with the plastic material, and the helically disposed rovings in each layer thereof being arranged in closely spaced substantially side-by-side relation.

9. A pipe consisting essentially of glass reinforcing fibers bonded together by and substantially embedded in a monolithic and substantially impervious hollow cylindrical body of plastic material, said glass fibers being applied in a series of layers comprising (1) a helical wrapping of a tape of randomly oriented substantially felted glass fibers, and (2) at least two layers of helically disposed glass fiber rovings, the pitches of the helices in said layers or rovings being opposite in direction but substantially equal in magnitude and forming an angle of substantially 35° with a plane normal to the axis of the pipe, each of said rovings being completely surrounded by and impregnated with the plastic material, and the helically disposed rovings in each layer thereof being arranged in closely spaced substantially side-by-side relation.

10. A pipe consisting essentially of glass reinforcing fibers bonded together by and substantially imbedded in a monolithic and substantially impervious hollow cylindrical body of plastic material, said glass fibers being applied in a series of layers comprising (1) a helical wrapping of a tape of randomly oriented substantially felted glass fibers, (2) at least two layers of helically disposed glass fiber rovings overlying said tape wrapping, and (3) at least one layer of longitudinally disposed glass fiber rovings extending substantially parallel to the axis of the pipe and distributed uniformly about the circumference thereof, the pitches of the helices of the rovings in said layers of helically disposed rovings being opposite in direction but substantially equal in magnitude, and the helically disposed rovings in each layer thereof being arranged in closely spaced substantially side-by-side relation at an angle $a$ to a plane normal to the axis of the pipe such that $$3 \sin^2 a + \left(\frac{2}{m}\right) \sin a = 1$$

in which $m$ is the ratio of the total cross-sectional area of all the glass fibers in helically disposed rovings to the total cross-sectional area of all the glass fibers in longitudinally disposed rovings.

References Cited in the file of this patent

UNITED STATES PATENTS

| | | |
|---|---|---|
| 1,242,903 | Angier | Oct. 16, 1917 |
| 2,206,059 | Slayter | July 2, 1940 |
| 2,390,039 | Slayter et al. | Nov. 27, 1945 |
| 2,467,999 | Stephens | Apr. 19, 1949 |
| 2,476,817 | Charnes | July 19, 1949 |
| 2,552,599 | Stout | Apr. 19, 1949 |
| 2,594,693 | Smith | Apr. 29, 1952 |
| 2,614,058 | Francis | Oct. 14, 1952 |